United States Patent
Asher

(10) Patent No.: US 7,739,154 B1
(45) Date of Patent: Jun. 15, 2010

(54) METHOD AND SYSTEM FOR DYNAMICALLY EXTENDING THE DURATION OF AN AUCTION

(75) Inventor: Michael L. Asher, Green Cove Spring, FL (US)

(73) Assignee: AT&T Corp, New York, NY (US)

( * ) Notice: Subject to any disclaimer, the term of this patent is extended or adjusted under 35 U.S.C. 154(b) by 141 days.

(21) Appl. No.: 11/799,797

(22) Filed: May 3, 2007

(51) Int. Cl.
*G06Q 30/00* (2006.01)

(52) U.S. Cl. .......................................... 705/26; 705/37
(58) Field of Classification Search .................. 705/26, 705/27, 37
See application file for complete search history.

(56) References Cited

U.S. PATENT DOCUMENTS

| | | | |
|---|---|---|---|
| 6,199,050 B1 * | 3/2001 | Alaia et al. .................... 705/37 |
| 6,216,114 B1 * | 4/2001 | Alaia et al. .................... 705/37 |
| 2004/0034590 A1 * | 2/2004 | Zinberg ........................ 705/37 |
| 2007/0055577 A1 * | 3/2007 | Ashton ......................... 705/26 |
| 2008/0004975 A1 * | 1/2008 | Scargill et al. ................ 705/26 |
| 2008/0313089 A1 * | 12/2008 | Du Preez ..................... 705/80 |
| 2009/0112726 A1 * | 4/2009 | Miller et al. .................. 705/26 |

FOREIGN PATENT DOCUMENTS

WO    WO 0145002 A1 * 6/2001
WO    WO 0184448 A1 * 11/2001

OTHER PUBLICATIONS

Walczak, Steven; Gregg, Dawn G; Berrenberg, Joy L. "Market Decision Making for Online Auction Sellers" Journal of Electronic Commerce Research. 2006. v7n4. 199-220.*

* cited by examiner

*Primary Examiner*—Yogesh C Garg
*Assistant Examiner*—Matthew Zimmerman

(57) ABSTRACT

This is a method for use in conducting online and/or proxy-based auctions. This method achieves the best possible price in a timely manner, by more closely simulating the mechanics of a face-to-face auction transaction where bidding is not closed at a preset time but by balancing bid frequency against conducting a timely transaction. The process extends the auction closing time by a geometrically decreasing amount to accommodate bids entered near the end of the auction.

15 Claims, 2 Drawing Sheets

METHOD AND SYSTEM FOR DYNAMICALLY EXTENDING THE DURATION OF AN AUCTION

FIELD OF THE INVENTION

The present invention relates generally to providing online or proxy based auction transactions. More particularly, the present application relates to optimizing the results of online or proxy-based auction transactions to achieve the best possible price in a timely manner by more closely simulating the mechanics of a face-to-face auction transaction.

BACKGROUND OF THE INVENTION

Internet-based auctions are a growing market that generates vast revenues. One auction house alone (Ebay) handles $50 billion in annual gross merchandise volume, with an annual growth rate of over 10%. The volume is so high that relatively minor optimizations in transaction efficiency can yield large rewards.

Due to Internet bidders being physically separated from each other, Internet auctions have evolved a system of proxy bidding. In proxy bidding, bidders do not place their bids directly against each other. Rather, they define a "maximum" bid they are willing to make; then, as other bidders set their amounts, the proxy system places increasingly higher bids up to the defined maximum. If a potential buyer is outbid, the proxy system will notify them (typically by email) and allow them the opportunity to raise their maximum bid.

Current online proxy bidding is designed to simulate a face-to-face auction, but it has serious deficiencies. First, it ignores the psychology of the typical bidder—most buyers do not know the maximum they are willing to pay until they are actually outbid. A subconscious level of distrust in a proxy system may also be involved. Many buyers will bid only high enough to beat the current bid, and if outbid by the proxy system, may eventually define a higher maximum. Historical data for online transactions support this, with very few users placing their highest bid immediately.

A second and more serious problem exists. Many people, knowing this innate tendency to underbid, will defer their own bids until the final few seconds of an auction. By the time the system has notified the previous high bidder that they have been outbid, the auction has closed. Thus, they circumvent the possibility of being outbid.

Both the above issues act in concert to reduce the efficiency of online auctions, and prevent their extracting the maximum sale price from each transaction. As auction house revenues are based off gross sale volume, this is a serious issue for such businesses.

There therefore remains a need for a cost-effective technique to conduct and manage online proxy bidding, while minimizing the above-described disadvantages.

SUMMARY OF THE INVENTION

The present invention addresses the needs described above by providing a method and system for conducting and managing online proxy based auction transactions.

One embodiment is a method for conducting an online auction transaction comprising the steps of setting a first Auction Closing Time at which the auction is to end; setting a first Exclusionary Interval immediately before the Auction Closing Time; receiving a valid bid; determining whether the valid bid is received during the first Exclusionary Interval; if the valid bid is received during the first Exclusionary Interval, then extending the Auction Closing Time by an extension period, and replacing the first Exclusionary Interval with a second Exclusionary Interval shorter than the first Exclusionary Interval and immediately before the extended Auction Closing Time.

The bid may be defined as valid if it exceeds all previous bids. The Auction Closing Time extension period may be equal to the value of the first Exclusionary Interval. The second Exclusionary Interval may be one fourth the first Exclusionary Interval.

The values for the Auction Closing Time extension period and for the second Exclusionary Interval may be retrieved from a lookup table. The method may be terminated after a predetermined number of auction extensions.

A seller may set the predetermined number of auction extensions.

The difference between the first and second Exclusionary Intervals may be based on a number of bidders within a previous closing time extension period. The second Exclusionary Interval in that method may be a function of the first Exclusionary Interval. The second Exclusionary Interval of that method may be based at least in part on a number of bidders engaging in the auction. The extension period may remain constant.

Another embodiment of the invention is a proxy based auction system for optimizing transaction results comprising a bid collector for receiving bids and an Auction Management Engine for determining whether bids are valid. The system also includes a parameter calculation and setting engine for: setting a first Auction Closing Time at which the auction is to end; setting a first Exclusionary Interval to be immediately before the Auction Closing Time; and, based on whether a valid bid is received during the Exclusionary Interval, conditionally extending the Auction Closing Time and setting a second Exclusionary Interval shorter than the first Exclusionary Interval and immediately before the extended Auction Closing Time.

The bid collector of the proxy based auction system may be connected to the Internet for receiving bids. The Auction Management Engine of the proxy based auction system may determine whether a bid is valid by determining whether it exceeds all previous bids.

The parameter calculation and setting engine of the proxy based auction system may extend the Auction Closing Time by a time period equal to the first Exclusionary Interval. The parameter calculation and setting engine of the proxy based auction system may further set a new Exclusionary Interval as a function applied to the current Exclusionary Interval.

Another embodiment of the invention is method for conducting an online auction transaction comprising the steps of setting a first Auction Closing Time at which the auction is to end; setting a first Exclusionary Interval immediately before the Auction Closing Time; receiving a valid bid; determining whether the valid bid is received during the first Exclusionary Interval; if the valid bid is received during the first Exclusionary Interval, then extending the Auction Closing Time by a time period equal to the first Exclusionary Interval and replacing the first Exclusionary Interval with a second Exclusionary Interval equal to one quarter of the first Exclusionary Interval.

The bid may be defined as valid if it exceeds all previous bids. The method may further be terminated after a predetermined number of auction extensions. A seller in the method may further set the predetermined number of auction extensions

DESCRIPTION OF THE INVENTION

The inventor has developed a method and system for optimizing the results of online or proxy-based auction transactions.

Herein is described a technique for optimizing such transactions. It works by more closely simulating the mechanics of a live auction, conducted by an auctioneer who closes bidding not at any preset time, but by balancing bid frequency against conducting a timely transaction. An Auction Closing Time is defined as the point at which no further bids may be accepted. In the present invention, an additional value, called an Exclusionary Interval, is defined as the period of time immediately prior to the Auction Closing Time in which a bid, if received, will trigger an extension to the Auction Closing Time.

In the method of the present invention, the Auction Closing Time is extended and the Exclusionary Interval is decreased one or more times before the auction ends. The length of the auction Exclusionary Interval may be coupled to the length of the extension of the Auction. Closing Time in the manner described below.

Figure 1:
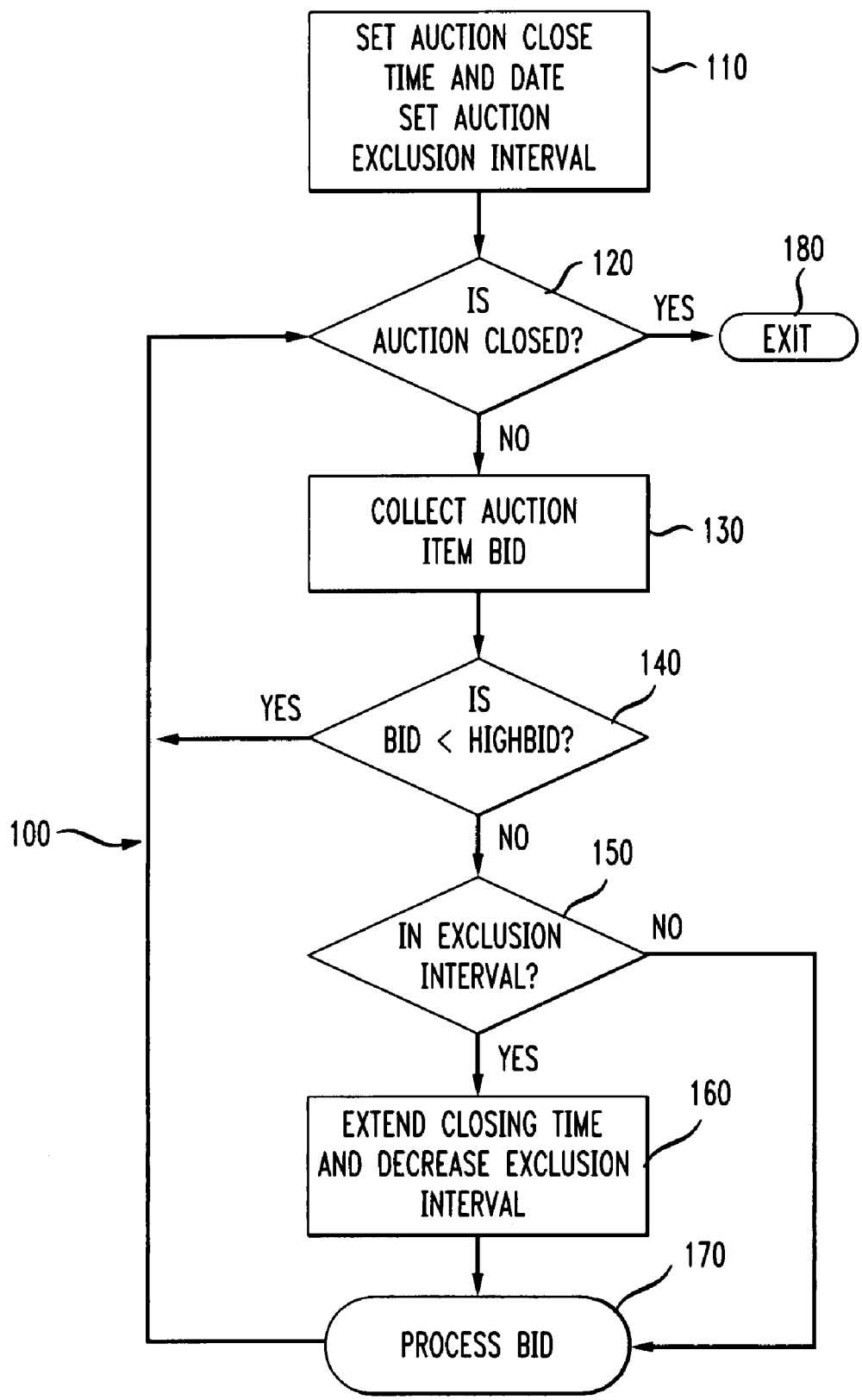
FIG. 1 is a flow chart depicting a method according to one embodiment of the invention.

A flowchart depicting a method 100, according to one embodiment of the invention, is shown in FIG. 1. For each auction, the method is initialized by setting two values (step 110): the Auction Closing Time and the Exclusionary Interval. Those initial values may be the same for all auctions, or may vary depending on the type of goods or services being sold. Typical values might be an Auction Closing Time creating a five day auction and an Exclusionary Interval of four hours. These values may be automatically set by the proxy service, may be chosen by the seller, or maybe determined based on a combination of those and/or other factors.

A bid received before the Exclusionary Interval will not affect the Auction Closing Time. Any bid within the Exclusionary Interval, however, will extend the close time of the auction. In one exemplary embodiment, the closing time is extended by a period of time equal to the current Exclusionary Interval. For example, where the initial Auction Closing Time is five days and the initial Exclusionary Interval is four hours, the Auction Closing Time would be extended four hours beyond the original five days.

Returning to FIG. 1, the system tests whether the auction has closed (step 120); i.e. whether the Auction Closing Time has expired. If the auction has already closed, then the item is no longer for sale. In this case, no more bids on the item can be accepted and the auction is complete (step 180).

If the auction is not closed, a bid is received (step 130) to be processed. The validity of the received bid is tested (step140) by determining whether the amount of the received bid is higher than the current high bid. If the received bid is not higher than the current high bid, then the received bid is ignored and the system waits for another bid. Bids that do not change the current high bid (i.e., bids where no one is "outbid") are ignored for purposes of extending the auction duration. If the bid is valid it is processed as outlined below.

The system then checks (step 150) whether the bid was received during the Exclusionary Interval. If this event occurs, the Auction Closing Time is then extended by an auction extension value and a new, smaller exclusionary interval is defined (step 160).

In a preferred embodiment, the new Exclusionary Interval is set to a value equal to a fixed percentage of the current Exclusionary Interval. For example the new Exclusionary Interval may be 25% of the current Exclusionary Interval. Using the example of an initial four-hour Exclusionary Interval and the system described above; then extends the auction time by a value equal to the current Exclusionary Interval. A bid occurring within the four-hour Exclusionary Interval would extend the auction another four hours, and set a new, smaller Exclusionary Interval reduced from four hours to one hour. During the first three of the next four hours, a bid does not extend the auction further, but a new bid within the final hour (the reduced exclusionary interval), extends the auction one hour, and sets a new reduced exclusionary interval of 15 minutes. Any valid bid occurring before the auction Exclusionary Interval is processed normally without changing the Auction Closing Time or the auction Exclusionary Interval.

To allow auctions to complete in a timely manner, a minimum interval may be set so the decrementing process does not continue indefinitely. The auction proxy provider or the seller may select a maximum number of auction extensions, in addition to selecting the auction duration.

The function by which the Exclusionary Interval descends can be adjusted based upon the number of unique bidders engaging in the auction, and based on the relative number of bids within the previous interval. This allows auctions with "heavy bidding" to continue for longer intervals than those with a lighter level of interest.

Several embodiments are contemplated for adjusting the auction Exclusionary Interval in a subsequent Auction Close Time. One embodiment, discussed above, is to add time equal to the auction Exclusionary Interval to the end of the auction bid time, extending the auction closing time by the length of the auction Exclusionary Interval, and then define a new, smaller auction Exclusionary Interval, calculated as one fourth of the original auction Exclusionary Interval.

In another embodiment, each bid time extension value and Exclusionary Interval is retrieved from a lookup table. The lookup table contains pairs of values comprising the bid time extension and the Exclusionary Interval. Each bid received during the Exclusionary Interval causes a pair of values to be retrieved from the lookup table. The system applies these values by adding the auction extension value to the Auction Closing Time yielding an extended Auction Closing Time, and applies the retrieved Exclusionary Interval by replacing the auction Exclusionary Interval with the retrieved Exclusionary Interval.

In another embodiment, the Exclusionary Interval is diminished by applying a function to the original Exclusionary Interval, yielding the next decreased Exclusionary Interval. For example, the new Exclusionary Interval is determined by taking the square root of the current Exclusionary Interval.

A constant value may be used to extend the auction bid time in successive iterations, and a constant value may be used to decrease the Exclusionary Interval.

The functions by which the Exclusionary Interval descends and the Auction Closing Time is extended, may be based upon both the number of unique bidders engaging in the auction, and the relative number of bids within the previous interval. For example, the auction Exclusionary Interval may decrease by a factor inversely proportional to the total number of bids received during the latest closing time extension.

The described method allows an online auction to extract maximum potential from each transaction, resulting in higher revenues for the conducting agency and higher customer satisfaction from customers listing items for auction. Furthermore, it reduces the tendency of some bidders to engage in making "last-second" bidding tactics, which frustrates many buyers and may put them off from participating entirely.

Figure 2:
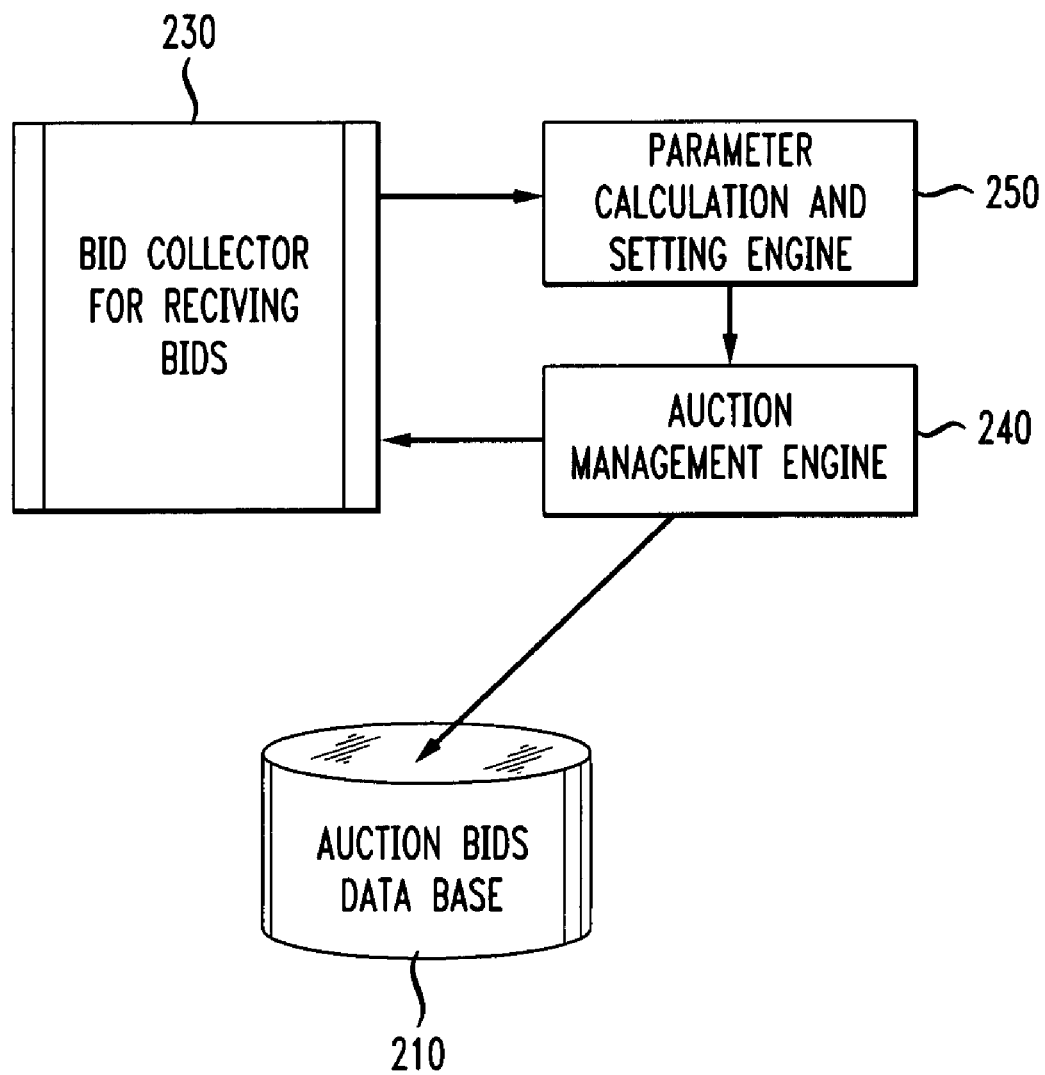
FIG. 2 is a schematic representation of a proxy based auction transaction system according to one embodiment of the invention.

FIG. 2 depicts a system and auction platform for one embodiment of the invention. Bids are received from bidders via the bid collector 230. The bids are typically received using methods employed in current on-line proxy based auctions. The bid collector is connected to a parameter calculation and storage setting engine 250. The parameter calculation and storage setting engine sets the initial value for the Auction Closing Time and the initial value for the Exclusionary Interval. The main processing for the system is performed by an Auction Management Engine (AME) 240. It is in the AME that the tests are performed for an auction being open, comparison of current bid to high bid and for being in the auction Exclusionary Interval. The AME recalculates the auction Exclusionary Interval when appropriate and processes valid bids. Processed bids are stored in the Auction Bids Data Base 210.

The system and method of the invention provide for optimizing results of online or proxy based auction transactions in a fast, accurate and time-efficient way, and enables auction providers to make available high quality service and also maximize revenues.

The method furthermore reduces the need for participants to know their maximum bid in advance of an auction. It also requires no special knowledge of the participants; for example, participants do not need to understand interne bidding systems or the auction platform. The method maximizes the potential sale price per auction item an ongoing proxy based transactions.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein with respect to a proxy based auction transaction system residing within the Internet, the method and apparatus of the invention may be instead embodied by an automated system that is not connected to the Internet, for example. The invention is not limited to use with particular techniques for setting the initial values for the Auction Closing Time and Exclusionary Interval, and the techniques of decreasing the Exclusionary Interval, as described in this specification, but can be used with other control values and technology existing today or developed in the future. It is to be understood that the embodiments shown and described herein are only illustrative of the principles of the present invention and that various modifications may be implemented by those skilled in the art without departing from the scope and spirit of the invention.

What is claimed is:

1. A method for conducting an online auction transaction comprising the steps of:
    creating, by a Parameter Calculation and Setting Engine, an auction having a start time, a closing time, and an exclusionary interval, wherein the exclusionary interval begins before the closing time and ends at the closing time;
    receiving a total number of bids for the auction placed during the exclusionary interval, wherein the total number of bids is at least two bids;
    determining, by an Auction management Engine, that each bid in the total number of bids is valid;
    calculating, by the Parameter Calculation and Setting Engine, in response to the determination:
        a new closing time, wherein the new closing time is calculated to occur after the closing time;
        an extension period, wherein the extension period is calculated to equal the amount of time between the closing time and the new closing time; and
        a new exclusionary interval, wherein the new exclusionary interval is calculated to be shorter than the exclusionary interval by a factor inversely proportional to the total number of bids for the auction placed during the exclusionary interval;
    updating the closing time to the new closing time; and
    updating the exclusionary interval to the new exclusionary interval.

2. The method of claim 1, wherein each bid in the total number of bids is valid if it exceeds all previous bids.

3. The method of claim 1, wherein the extension period is equal to the exclusionary interval.

4. The method of claim 1, wherein the steps of receiving, determining, calculating, and updating are repeated a predetermined number of times.

5. The method of claim 4, wherein a seller sets the predetermined number.

6. The method of claim 4, wherein the extension period remains constant when the steps of receiving, determining, calculating, and updating are repeated.

7. A proxy based auction system for optimizing transaction results comprising:
    a Bid Collector connected to the Internet; an Auction Management Engine connected to the Bid Collector;
    a Parameter Calculation and Setting Engine connected to the bid collector; and
    a memory configured to cause the proxy based auction system to perform the following steps:
        creating, by the Parameter Calculation and Setting Engine, an auction having a start time, a closing time, and an exclusionary interval, wherein the exclusionary interval begins before the closing time and ends at the closing time;
        receiving a total number of bids for the auction placed during the exclusionary interval, wherein the total number of bids is at least two bids;
        determining, by the Auction management Engine, that each bid in the total number of bids is valid;
        calculating, by the Parameter Calculation and Setting Engine, in response to the determination:
            a new closing time, wherein the new closing time is calculated to occur after the closing time;
            an extension period, wherein the extension period is calculated to equal the amount of time between the closing time and the new closing time; and
            a new exclusionary interval, wherein the new exclusionary interval is calculated to be shorter than the exclusionary interval by a factor inversely proportional to the total number of bids for the auction placed during the exclusionary interval;
        updating the closing time to the new closing time; and
        updating the exclusionary interval to the new exclusionary interval.

8. The proxy based auction system of claim 7, wherein the determination by the Auction Management Engine whether each bid in the total number of bids is valid is based on whether it exceeds all previous bids.

9. The proxy based auction system of claim 7, wherein the extension period is equal to the exclusionary.

10. A method for conducting an online auction transaction comprising the steps of:
creating, by a Parameter Calculation and Setting Engine, an auction having a start time, a closing time, and an exclusionary interval, wherein the exclusionary interval begins before the closing time and ends at the closing time;
receiving a bid for the auction placed during the exclusionary interval;
determining, by an Auction management Engine, that the bid is valid;
calculating, by the Parameter Calculation and Setting Engine, in response to the determination:
a new closing time, wherein the new closing time is calculated to occur after the closing time;
an extension period, wherein the extension period is calculated to equal the amount of time between the closing time and the new closing time; and
a new exclusionary interval, wherein the new exclusionary interval is calculated to be the square root of the exclusionary interval;
updating the closing time to the new closing time; and
updating the exclusionary interval to the new exclusionary interval.

11. The method of claim 10, wherein the bid is valid if it exceeds all previous bids.

12. The method of claim 10, wherein the extension period is equal to the exclusionary interval.

13. The method of claim 10, wherein the steps of receiving, determining, calculating, and updating are repeated a predetermined number of times.

14. The method of claim 13, wherein a seller sets the predetermined number.

15. The method of claim 13, wherein the extension period remains constant when the steps of receiving, determining, calculating, and updating are repeated.

* * * * *